(12) United States Patent
Loke

(10) Patent No.: US 6,311,048 B1
(45) Date of Patent: Oct. 30, 2001

(54) INTELLIGENT CONTROL OF RECEIVER LINEARITY BASED ON INTERFERENCE

(76) Inventor: Aravind Loke, 95 Summerstone, Irvine, CA (US) 94614

( * ) Notice: Subject to any disclaimer, the term of this patent is extended or adjusted under 35 U.S.C. 154(b) by 0 days.

(21) Appl. No.: 09/160,613

(22) Filed: Sep. 24, 1998

(51) Int. Cl.[7] .................................................. H04B 1/06
(52) U.S. Cl. ................................. 455/245.1; 455/250.1; 455/343
(58) Field of Search .................................... 455/136, 574, 455/38.3, 68, 69, 70, 245.1, 250.1, 343, 240.1, 522, 127, 76, 232.1, 246.1, 234.1; 330/149

(56) References Cited

U.S. PATENT DOCUMENTS

| | | | |
|---|---|---|---|
| 5,179,724 | * | 1/1993 | Lindoff ................................. 455/343 |
| 5,465,408 | * | 11/1995 | Sugayama et al. ............... 455/249.1 |
| 5,661,442 | * | 8/1997 | Sparks ................................. 455/126 |
| 5,697,081 | * | 12/1997 | Lyall, Jr. et al. ................. 455/249.1 |
| 5,722,061 | * | 2/1998 | Hutchinson, IV et al. ....... 455/245.1 |
| 5,805,979 | * | 9/1998 | Miyashita ............................. 455/343 |
| 5,815,821 | * | 9/1998 | Pettersson ............................ 455/575 |
| 5,940,749 | * | 8/1999 | Cho et al. ......................... 455/249.1 |

* cited by examiner

Primary Examiner—Nguyen Vo
Assistant Examiner—Duc Nguyen

(57) ABSTRACT

A method and system for intelligently controlling the linearity of an RF receiver by selectively increasing the effective third-order intercept point (IP3) value of a low noise amplifier (LNA)/mixer channel only when needed. A control signal is generated based on mode of operation (receive mode); received signal strength information (RSSI); transmit channel output power, as indicated by a Tx automatic gain control (AGC) signal; and the true received signal strength, as indicated by the pilot signal-to-noise ratio in a CDMA system. The control signal is then used to selectively increase the bias current—and thus linearity—of the LNA/mixer channel, or to select one of several LNAs having differing IP3 values to effectively increase the linearity of the LNA/mixer channel.

30 Claims, 2 Drawing Sheets

INTELLIGENT CONTROL OF RECEIVER LINEARITY BASED ON INTERFERENCE

TECHNICAL FIELD

This invention relates to electronic communication systems, and more particularly to intelligent control of linearity in electronic receivers, such as code division multiple access (CDMA) receivers.

BACKGROUND

Certain types of radio frequency (RF) receivers that utilize a low noise amplifier (LNA) need to perform under conditions that demand very high linearity of the LNA and RF down conversion electronics. Such receivers are used in code division multiple access (CDMA) wireless communication systems. In a CDMA wireless communication system, users share all time and frequency resources simultaneously. This is accomplished by assigning each user a distinct Walsh code or user-unique digital code with special properties to achieve minimal interference between users. This code is added to the information data and modulated onto the carrier. An identical code is used in the receiver which is used to correlate the two signals. The correlation process only passes data that matches the code sequence. In this way, non-valid signals (i.e., signals from other users) are not decoded and appear as noise. Noise immunity is provided by means of the code spreading the spectrum of the information signal to a much wider bandwidth than is needed for baseband signal transmission. This ability of a CDMA system to reject unwanted signals allows for operation in high noise environments. Further information regarding CDMA systems is set forth in the well-known IS95 standard.

In one mode of operation, an IS95 compliant CDMA system permits duplex communications—that is, simultaneous transmission and reception of an RF signal. One problem of this mode is that the presence of an interference signal as the transmit (Tx) channel approaches its maximum power output generally causes cross-modulation of the Tx signal envelope. This results in "in-band" interference in the Rx channel. Such in-band interference can cause degradation in the received signal quality and subsequent call drop.

As is known in the art, the input third-order intercept point (IP3) of an LNA/mixer channel can be adjusted to a high value to keep cross-modulation within tolerable limits. The IP3 is a virtual measurement of the signal strength at which the power of the 3rd-order distortion energy of a gain stage is as strong as the fundamental signal energy. Using a high IP3 value increases the linearity of an LNA/mixer channel. However, a high IP3 value also results in a high bias current to the LNA/mixer channel, draining battery power and thus reducing both talk and standby time for an RF telephone. Nevertheless, maintaining a high IP3 value is the conventional approach to overcoming the cross-modulation problem noted above.

Accordingly, the inventor has determined that a better method and system is needed to control cross-modulation during duplex communications of an RF communication system that overcomes the problems noted above. The present invention provides such a method and system.

SUMMARY

The inventor has realized that, statistically, most of the operation time of an LNA-based RF communication system, such as a CDMA cellular telephone, is at low power levels of about −13 dBm. Thus, rather than maintain a high IP3 level at all times to manage cross-modulation during the relatively infrequent occasions where such cross-modulation occurs, the invention intelligently controls the linearity of an RF receiver by selectively increasing the effective IP3 value of an LNA/mixer channel only when needed.

In particular, a control signal is generated based on mode of operation (power consuming); received signal strength information (RSSI); transmit channel output power, as indicated by a Tx automatic gain control (AGC) signal; and the true received signal strength, as indicated by the pilot signal-to-noise ratio. The control signal is then used to selectively increase the bias current—and thus linearity—of the LNA/mixer channel, or to select one of several LNAs having differing IP3 values to effectively increase the linearity of the LNA/mixer channel.

In one aspect, the invention includes a method and system for intelligently controlling the linearity of a receiver in a radio frequency transceiver, including determining if the transceiver is in a receive mode, and if interference is present in the receiver, and if transmit power within the transceiver is high, and if receiver power within the transceiver is low; and controlling the effective third-order intercept point (IP3) value of a LNA/mixer channel within the receiver in response to such determinations.

The details of one or more embodiments of the invention are set forth in the accompanying drawings and the description below. Other features, objects, and advantages of the invention will be apparent from the description and drawings, and from the claims.

DETAILED DESCRIPTION

Circuit Configuration

Figure 1:
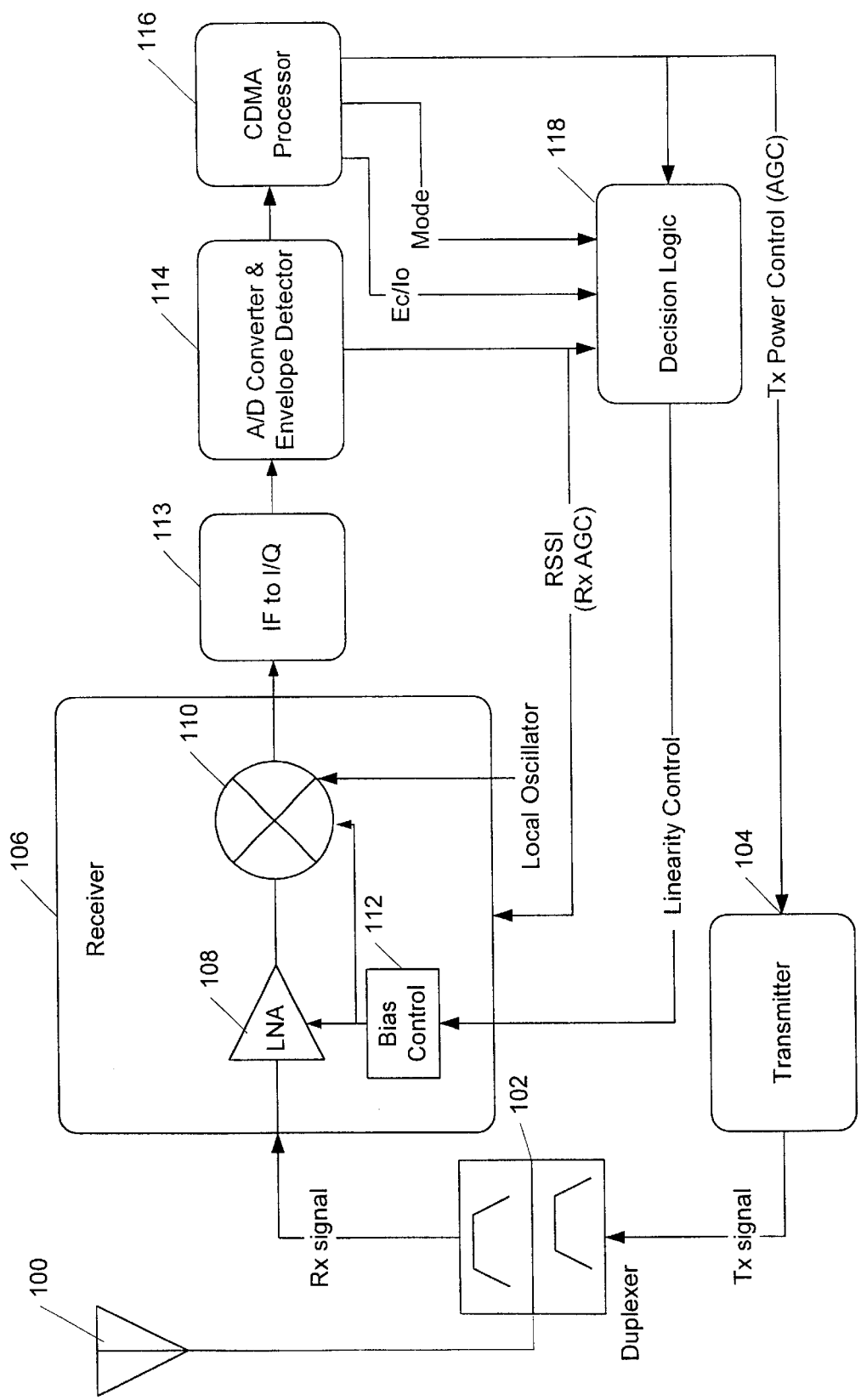
FIG. 1 is block diagram of an RF transceiver in accordance with the invention.

FIG. 1 is block diagram of an RF transceiver in accordance with the invention. An antenna 100 transmits and receives RF signals. A duplexer 102 filters incoming (Rx) and outgoing (Tx) RF signals to block unwanted signals and pass desired signals. The duplexer 102 also couples the antenna 100 to Tx signals from a transmitter 104 and couples Rx signals from the antenna 100 to a receiver module 106. The receiver module 106 includes an LNA/mixer channel, comprising a low noise amplifier 108 and mixer 110, for generating an IF signal from the Rx signal and a local oscillator signal, and an LNA/mixer bias control circuit 112, configured in known fashion.

The output of the receiver module 106 is coupled to an intermediate frequency (IF) circuit 113 which includes the necessary filters and gain control amplifiers. The signal is further converted to I/Q (in-phase and quadrature) components to be processed by a conventional analog-to-digital (A/D) converter and envelope detector 114. The A/D converter and envelope detector 114 generates a received signal strength information (RSSI) signal, which is proportional to the amplitude of the composite Rx signal before "despreading". Presence of strong interference signals can be (wrongly) indicated as a higher apparent received signal strength. The RSSI signal is generated by detecting the envelope of the Rx signal after down conversion, and is relatively fast in response.

The output of the A/D converter and envelope detector 114 is coupled to a conventional CDMA processor 116 that preforms despreading by code correlation, CDMA pilot channel demodulation, and other known CDMA baseband processing functions.

The CDMA processor 116 generates several outputs. One output is a Mode single, indicating whether the transceiver is operating in duplex mode or simplex mode. A second output is a pilot signal-to-noise ratio, commonly known as Ec/Io, which is determined after despreading the received signal bandwidth. Interference energy is suppressed by the processing gain of the system. The Ec/Io signal is a measure of the true received signal strength. Comparing the RSSI signal and the Ec/Io signal can be used to determine the presence of interference in the Rx channel.

The third output of the CDMA processor 116 is a Tx AGC signal that is normally used to control the transmit channel output power. Thus, the value of the Tx AGC signal can be used to determine when Tx power is approaching its maximum value in duplex mode.

The RSSI, Ec/Io, Tx AGC, and Mode signals are coupled to Decision Logic 118, which generates a Linearity Control signal. In the illustrated embodiment, the Linearity Control signal is shown as controlling the current output of the bias control circuit 112. In an alternative embodiment, the Linearity Control signal can be used to select one of several LNAs having differing IP3 values (e.g., using a switch or multiplexor coupled to several LNAs). In either case, the Linearity Control signal selectively changes the effective IP3 value of the LNA/mixer channel of the receiver module 106 only when needed.

Decision Logic

Figure 2:
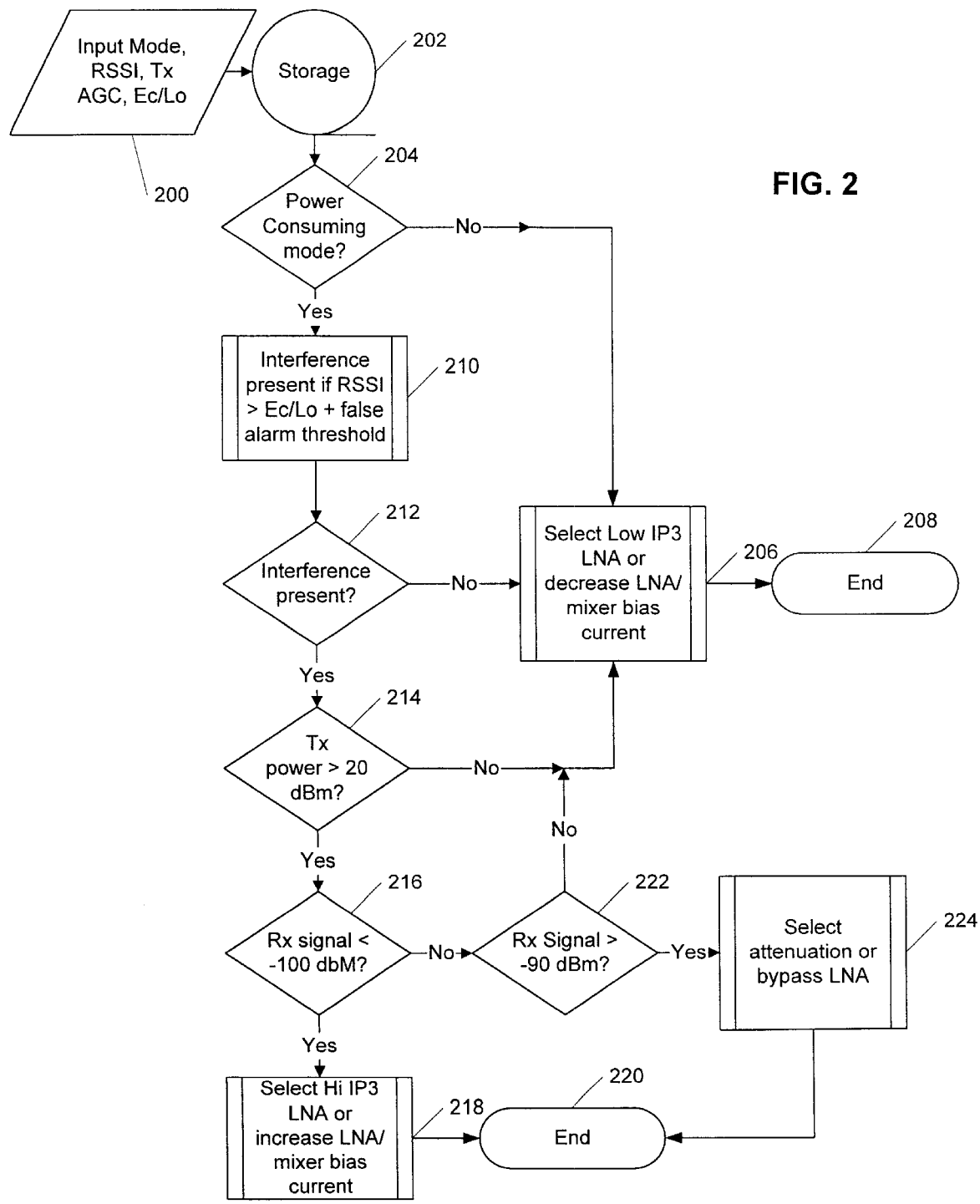
FIG. 2 is a flowchart showing the preferred decision logic for the present invention.

The basic purpose of the Decision Logic 118 is to increase the effective linearity of the LNA 108 and mixer 110 when the transceiver is in a duplex mode or idle mode (when the receive circuitry must still be active), and interference is detected, and Tx power is high, and Rx power is low. FIG. 2 is a flowchart showing the preferred Decision Logic 118 for the present invention.

The four signals noted above—RSSI, Ec/Io, Tx AGC, and Mode—are input into the Decision Logic 118 (STEP 200), and preferably temporarily stored (e.g., in registers or memory) (STEP 202). Of course, these values will change over time, and the process shown in FIG. 2 normally would be repeated periodically.

If the transceiver is not in a receive mode (i.e., a duplex mode such as a CDMA "Tx/Rx" mode, or an "Idle" mode) (STEP 204), then there is no need to increase the linearity of the LNA/mixer channel (i.e., the LNA 108 and mixer 110). Accordingly, the Linearity Control signal is set to select a low IP3 LNA or decrease the LNA/mixer channel bias current (STEP 206), at which point the decision logic is done for the current cycle (STEP 208).

If the transceiver is in a receive mode (STEP 204), then further testing is needed to determine if interference is present. In the preferred embodiment, interference is considered to be present if the RSSI value is greater than the Ec/Io value plus a "false alarm" threshold value (STEP 210). The "false alarm" threshold value (generally determined empirically) ensures that the difference between the RSSI value and the Ec/Io value is significant. Accordingly, the RSSI and Ec/Io input signals are compared to determine if interference is present (STEP 212). If not, then the Linearity Control signal is set to select a low IP3 LNA or decrease the LNA/mixer channel bias current (STEP 206), at which point the decision logic is done for the current cycle (STEP 208).

If interference is present (STEP 212), then an additional test is performed to determine if the Tx power is high; in the illustrated embodiment, a threshold value of 20 dBm is used as a comparison value (STEP 214). If the Tx power is not currently high, then the Linearity Control signal is set to select a low IP3 LNA or decrease the LNA/mixer channel bias current (STEP 206), at which point the decision logic is done for the current cycle (STEP 208).

If the Tx power is currently high (STEP 214), then an additional test is performed to determine if the Rx power is low; in the illustrated embodiment, a threshold value of −100 dBm is used as a comparison value (STEP 216). If the Rx power is currently low, then the Linearity Control signal is set to select a high IP3 LNA or increase the LNA/mixer channel bias current (STEP 218), at which point the decision logic is done for the current cycle (STEP 220).

An additional test is performed to account for "test" conditions within the system in which two interference tones are applied at a −79 dBm input signal level. These interference tones can cause in-band spurious frequencies. However, the LNA gain is not important at this high signal level. Accordingly, the Rx signal is tested to see if it is greater than about −85 dBm (this threshold value can be varied empirically). If not, then the Linearity Control signal is set to select a low IP3 LNA or decrease the LNA/mixer channel bias current (STEP 206), at which point the decision logic is done for the current cycle (STEP 208). Otherwise, the LNA is bypassed or an attenuator (e.g., a PIN diode) is switched in before the LNA/mixer channel (STEP 224), at which point the decision logic is done for the current cycle (STEP 220).

Benefits of the invention include intelligently controlling the linearity of an RF receiver by selectively increasing the effective IP3 value of an LNA/mixer channel only when needed, and thus improves talk time during duplex communications. Further, when not in a receive mode (e.g., idle or duplex communication modes), power is conserved since a high IP3 value need not be maintained at all times in such modes (e.g., sleep and FM modes). In one embodiment of the invention, it is estimated that the power saving in the receiver channel is greater than about 20% compared to the art. The invention also provides a method and system for determining the presence of interference on a received signal.

Computer Implementation

The Decision Logic 118 may be implemented in hardware or software executing on a general purpose processor, or a combination of both (e.g., programmable logic arrays). For example, the process described in FIG. 2 may be implemented in one or more computer programs executing on programmable systems each comprising at least one processor and at least one data storage system (including volatile and non-volatile memory and/or storage elements) for storing program code. The program code is executed on the processors to perform the functions described herein. Each such program may be implemented in any desired computer language (including machine, assembly, high level procedural, or object oriented programming languages) to communicate with a computer system. In any case, the language may be a compiled or interpreted language. Each such computer program is preferably stored on a storage media or device (e.g., ROM, CD-ROM, tape, or magnetic media) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

A number of embodiments of the present invention have been described. Nevertheless, it will be understood that various modifications may be made without departing from the spirit and scope of the invention. For example, one of ordinary skill in the art will recognize that a number of the steps shown in FIG. 2 are not sequence dependent, and thus may be done in different orders. Accordingly, other embodiments are within the scope of the following claims.

What is claimed is:

1. A method for intelligently controlling the linearity of a receiver in a radio frequency transceiver, including the steps of:
   (a) determining if the transceiver is in a receive mode, and if interference is present in the receiver, and if transmit power within the transceiver is high, and if receiver power within the transceiver is low; and
   (b) controlling the effective third-order intercept point (IP3) value of a low noise amplifier (LNA)/mixer channel within the receiver in response to such determinations.

2. The method of claim 1, wherein determining if interference is present in the receiver includes the step of determining if a received signal strength information signal indicating the apparent strength of a signal received by the transceiver is significantly greater than the true received signal strength.

3. The method of claim 2, further including the step of determining the true received signal strength as a pilot signal-to-noise ratio.

4. The method of claim 1, wherein determining if transmit power within the transceiver is high includes the step of comparing a transmit channel automatic gain control signal within the transceiver to a selected threshold value.

5. The method of claim 1, wherein determining if receiver power within the transceiver is low includes the step of comparing a received signal strength information signal indicating the apparent strength of a signal received by the transceiver to a selected threshold value.

6. The method of claim 1, wherein determining if receiver power within the transceiver is low includes the step of comparing a pilot signal-to-noise ratio signal indicating the true strength of a signal received by the transceiver to a selected threshold value.

7. The method of claim 1, wherein the transceiver is a code division multiple access transceiver.

8. The method of claim 1, wherein controlling the effective IP3 value of the LNA/mixer channel includes increasing bias current to the LNA/mixer channel.

9. The method of claim 1, wherein controlling the effective IP3 value of the LNA/mixer channel includes selecting one of several LNAs having differing IP3 values.

10. A method for intelligently controlling the linearity of a receiver in a radio frequency transceiver, including the steps of:
    (a) determining:
        (1) if the transceiver is in a receive mode; and
        (2) if interference is present in the receiver by determining if a received signal strength information signal indicating the apparent strength of a signal received by the transceiver is significantly greater than the true received signal strength;
        (3) if transmit power within the transceiver is high by comparing a transmit channel automatic gain control signal within the transceiver to a selected threshold value;
        (4) if receiver power within the transceiver is low by comparing a pilot signal-to-noise ratio signal to a selected threshold value;
    (b) controlling the effective third-order intercept point (IP3) value of a low noise amplifier (LNA)/mixer channel within the receiver in response to such determinations.

11. The method of claim 10, further including the step of determining the true received signal strength as a pilot signal-to-noise ratio.

12. The method of claim 10, wherein the transceiver is a code division multiple access transceiver.

13. The method of claim 10, wherein controlling the effective IP3 value of the LNA/mixer channel includes increasing bias current to the LNA/mixer channel.

14. The method of claim 10, wherein controlling the effective IP3 value of the LNA/mixer channel includes selecting one of several LNAs having differing IP3 values.

15. A radio frequency transceiver, including a receiver having an associated low noise amplifier (LNA)/mixer channel and a transmitter, and having intelligent control of the linearity of the LNA/mixer channel, including:
    (a) signal processing circuitry for indicating a receive mode for the transceiver, the apparent power of a received signal, the true power of the received signal, and the transmit power of the transceiver;
    (b) decision logic, coupled to the signal processing circuitry, for determining if the transceiver is in a receive mode, and if interference is present in the receiver based upon the apparent power of the received signal and the true power of the received signal, and if transmit power within the transceiver is high, and if receiver power within the transceiver is low, and for generating a control signal in response to such determinations;
    (c) means for controlling the effective third-order intercept point value of the LNA/mixer channel in response to the control signal.

16. The radio frequency transceiver of claim 15, wherein the decision logic determines if interference is present in the receiver by determining if the apparent power of the received signal is significantly greater than the true power of the received signal.

17. The radio frequency transceiver of claim 15, wherein the signal processing circuitry includes an output indicating the apparent power of a received signal as a received signal strength information signal.

18. The radio frequency transceiver of claim 17, wherein the decision logic determines if receiver power within the transceiver is low by comparing the received signal strength information signal to a selected threshold value.

19. The radio frequency transceiver of claim 15, wherein the signal processing circuitry includes an output indicating the true power of a received signal as a pilot signal-to-noise ratio signal.

20. The radio frequency transceiver of claim 19, wherein the decision logic determines if receiver power within the transceiver is low by comparing the pilot signal-to-noise ratio signal to a selected threshold value.

21. The radio frequency transceiver of claim 15, wherein the signal processing circuitry includes an output indicating the transmit power of the transceiver as a transmitter channel automatic gain control signal.

22. The radio frequency transceiver of claim 21, wherein the decision logic determines if transmit power within the transceiver is high by comparing the transmitter channel automatic gain control signal to a selected threshold value.

23. The radio frequency transceiver of claim 15, wherein the transceiver is a code division multiple access transceiver.

24. The radio frequency transceiver of claim 15, wherein the means for controlling the effective third-order intercept point value of the LNA/mixer channel in response to the control signal includes a circuit for increasing bias current to the LNA/mixer channel.

25. The radio frequency transceiver of claim 15, wherein the means for controlling the effective third-order intercept point value of the LNA/mixer channel in response to the control signal includes means for selecting one of several LNAs having differing IP3 values.

26. A radio frequency transceiver, including a receiver having an associated low noise amplifier (LNA)/mixer channel and a transmitter, and having intelligent control of the linearity of the LNA/mixer channel, including:
  (a) signal processing circuitry for indicating a receive mode for the transceiver, the apparent power of a received signal as a received signal strength information signal, the true received signal strength of the received signal as a pilot signal-to-noise ratio signal, and the transmit power of the transceiver as a transmit channel automatic gain control signal;
  (b) decision logic, coupled to the signal processing circuitry, for generating a control signal in response to determining:
    (1) if the transceiver is in a receive mode; and
    (2) if interference is present in the receiver by determining if a received signal strength information signal indicating the apparent strength of a signal received by the transceiver is significantly greater than the true received signal strength;
    (3) if transmit power within the transceiver is high by comparing the transmit channel automatic gain control signal to a selected threshold value;
    (4) if receiver power within the transceiver is low by comparing the pilot signal-to-noise ratio signal to a selected threshold value;
  (c) means for controlling the effective third-order intercept point value of the LNA/mixer channel in response to the control signal.

27. The radio frequency transceiver of claim 26, wherein the transceiver is a code division multiple access transceiver.

28. The radio frequency transceiver of claim 26, wherein the means for controlling the effective third-order intercept point value of the LNA/mixer channel in response to the control signal includes a circuit for increasing bias current to the LNA/mixer channel.

29. The radio frequency transceiver of claim 26, wherein the means for controlling the effective third-order intercept point value of the LNA/mixer channel in response to the control signal includes means for selecting one of several LNAs having differing IP3 values.

30. A computer program, residing on a computer-readable medium, for intelligently controlling the linearity of a low noise amplifier (LNA)/mixer channel within a receiver in a radio frequency transceiver, the computer program comprising instructions for causing a processor within the transceiver to:
  (a) determine if the transceiver is in a duplex communication mode, and if interference is present in the receiver, and if transmit power within the transceiver is high, and if receiver power within the transceiver is low;
  (b) control the effective third-order intercept point (IP3) value of the LNA/mixer channel in response to such determination.

* * * * *